United States Patent
Dysarsz et al.

(10) Patent No.: US 6,407,670 B1
(45) Date of Patent: Jun. 18, 2002

(54) WILDLIFE CONDITIONING AND SUPPRESSION SYSTEM

(76) Inventors: Hans J. Dysarsz, 2577 Sasamat Street, Suite 302, Vancouver, British Columbia (CA), V6R 4A6; Rhonda Lorraine Millikin, 153 Willingdon Avenue, Kingston, Ontario (CA), K71 4H9

(*) Notice: Subject to any disclaimer, the term of this patent is extended or adjusted under 35 U.S.C. 154(b) by 0 days.

(21) Appl. No.: 09/523,047

(22) Filed: Mar. 10, 2000

(51) Int. Cl.$^7$ .................. A01K 15/04; G08B 23/00
(52) U.S. Cl. .............. 340/573.2; 119/719; 116/229; 367/139
(58) Field of Search ................ 119/713, 719, 119/721; 52/101; 43/59; 116/22 A, 137 R; 340/384.3, 541, 573.2; 367/139

(56) References Cited

U.S. PATENT DOCUMENTS

| | | | | |
|---|---|---|---|---|
| 3,718,987 A | * | 3/1973 | Carver | 434/48 |
| 4,449,474 A | * | 5/1984 | Mariol | 116/2 |
| 4,475,102 A | * | 10/1984 | Troy et al. | 340/385.1 |
| 4,996,521 A | * | 2/1991 | Hollow | 340/691.7 |
| 5,009,192 A | | 4/1991 | Burman | 119/720 |
| 5,207,179 A | * | 5/1993 | Arthur et al. | 119/721 |
| 5,307,763 A | * | 5/1994 | Arthur et al. | 119/718 |
| 5,450,063 A | * | 9/1995 | Peterson et al. | 340/573.2 |
| 5,517,180 A | * | 5/1996 | Masi et al. | 340/573.1 |
| 5,603,287 A | * | 2/1997 | Houck | 119/719 |
| 5,969,593 A | * | 10/1999 | Will | 340/384.2 |
| 5,977,866 A | * | 11/1999 | Joseph, Jr. et al. | 340/384.1 |
| 5,986,551 A | * | 11/1999 | Pueyo et al. | 340/573.1 |
| 6,016,100 A | * | 1/2000 | Boyd et al. | 340/384.2 |
| 6,118,375 A | * | 9/2000 | Duncan | 340/541 |
| 6,191,693 B1 | * | 2/2001 | Sangsingkeow | 340/573.3 |
| 6,232,880 B1 | * | 5/2001 | Anderson et al. | 340/573.3 |
| 6,250,255 B1 | * | 6/2001 | Lenhardt et al. | 119/713 |
| 6,285,630 B1 | * | 9/2001 | Jan | 367/139 |

OTHER PUBLICATIONS

Bird Hazards to Aircraft, Hans Blokpoel, Clark, Irwin & Company Limited,, pp. vii—3, p. 23–29, pp. 91–183. (1976).

Reduction of Bird Hazards to Aircraft: Research and Development of Strobe Light Technology as a Bird Deterrent, The Delta Environmental Management Group Ltd, Dec. 1993.

Bird Strike, An Assessment of the Hazard on UK Civil Aerodromes, 1976–1990, Central Science Laboratory, pp. 39–43, pp. 49–50. (1995).

Bruce MacKinnon, Transport Canada, New Technologies in Wildlife Control, Airport Wildlife Management, No. 19, Fall 1996.

Presentation by Weitech Inc. and Trillium Windmills Inc., 1999, Bird Strike Canada/US Conference May 9–13, 1999.

Brochure entitled "Scare Wars", Reed–Joseph International Company.

Brochure entitled "The Scare–Away System", Reed–Joseph International Company.

Product information sheet entitled "Desman Laser Model FL R 005", Reed–Joseph International Co.

(List continued on next page.)

Primary Examiner—Robert P. Swiatek
Assistant Examiner—John W. Zerr
(74) Attorney, Agent, or Firm—Law Offices of John A. Parrish (57) ABSTRACT

A wildlife conditioning and suppression system conditions wildlife to avoid a restricted area. The system relies on backing up predetermined and repeatable warning stimuli with real enforcement directed against the wildlife. In a preferred embodiment, a warning zone is defined around a protected area and predetermined sensory warning stimuli are produced each time wildlife enters the warning zone. If the wildlife enters the protected area, physical enforcement by means of a water cannon is used to eject the wildlife from the area. The wildlife is thereby conditioned to avoid the area by means of repeatable warning stimuli backed up with real enforcement.

68 Claims, 3 Drawing Sheets

OTHER PUBLICATIONS

Wildlife Management Mail Order Catalogue, No. 298, Margo Supplies Ltd.

Evaluation of the Efficacy of Products and Techniques for Airport Bird Control, Ross E. Harris and Rolph A. Davis, LGL Limited, Aerodrome Safety Branch Transport Canada, Mar. 31, 1998, minutes of the $28^{th}$ meeting of the Bird Strike Committee Canada, Jun. 9 and 10, 1998, Transport Canada/Department of National Defence.

Agri–SX Report, Airport Protection Against Birds, minutes of the $29^{th}$ meeting of Bird Strike Committee Canada, Oct. 22 and 23, 1998, Transport Canada/Department of National Defence, Oct. 1998.

Airport Services Manual, Part 3, Bird Control and Reduction, $3^{rd}$ edition 1991, ICAO, pp. 12–14, minutes of the $29^{th}$ meeting of Bird Strike Committee Canada, Oct. 22 and 23, 1998, Transport Canada/Department of National Defence (1991).

Van Egmond, T.D. and J.E. Green,. Assessment of strobe lights for reduction of bird–aircraft collisions. Prep. For Transportation Development of Centre and Transport Canada by The Delta Environmental Management Group Ltd., pp. i–v, 1–6, 1989.

* cited by examiner

WILDLIFE CONDITIONING AND SUPPRESSION SYSTEM

BACKGROUND OF THE INVENTION

It has long been recognized that bird strikes in the vicinity of airports represent a substantial and significant hazard for departing and incoming aircraft. It is estimated that bird strikes cause between $800 million and $2.5 billion worth of damage to civilian aircraft and airlines every year, with additional damage inflicted on military aircraft.

Considerable efforts have been directed at analyzing the bird strike problem and to identify means of keeping birds away from the areas surrounding airstrips. The Bird Strike Hazard Committee—U.S.A., the Bird Strike Committee Canada, the Bird Strike Avoidance Team (U.K.), the Bird Strike Committee Europe (International) and corresponding committees in other jurisdictions have long been engaged in the on-going task of analyzing the problem and of assessing potential solutions. Despite this, an effective solution to the problem has not been found.

The use of ultrasound and infrasound to repel or warn wildlife of imminent danger have both been considered but are considered impractical or ineffective for various reasons. Avoiding or eliminating habitat features that attract wildlife has also been suggested but this solution tends to be impractical in the environment of most airports and its effectiveness tends to be species-specific.

The prior art solutions most often considered and used rely on the production of stimuli that are intended to scare away the birds. These stimuli include scaring noises of a mechanical nature (e.g. horns, miscellaneous mechanical noises, scare cannons or scare guns), bio-acoustical sounds (e.g. recordings of distressed birds or of human voices), visual stimuli (e.g. lights, strobe lights, balloons or stuffed animals) and pyrotechnics (crackers, fireworks).

However, it is broadly recognized that wildlife, and particularly birds, become habituated to various stimuli and eventually cease to be repelled or scared by them. In an attempt to minimize habituation, many prior art approaches provide randomness and variety to render the stimuli unpredictable (e.g. Hans Blokpoel, Bird Hazards to Aircraft, Clarke, Irwin & Company, 1976; Scare Wars (product literature), Reed-Joseph International Company; Peterson, et al. U.S. Pat. No. 5,450,063). These measures have the effect of delaying the onset of habituation. However, they do not prevent it. Indeed, it is broadly recognized that the prior art scaring solutions do not repel birds with any significant degree of permanency (Van Egmond and Green, 1989).

More sophisticated and labour intensive approaches to keeping birds at bay include the use of model airplanes, falconry or bird dogs. These approaches each require considerable human intervention and have their own particular limitations. They are also costly and are sometimes unreliable or simply unsafe, particularly in airport environments.

It is also known in the prior art to conduct occasional killing of birds, sometimes leaving the corpse to lie within sight of other birds, in an attempt to avoid habituation to dispersal stimuli. However, this is an extreme measure and is nonetheless labour intensive and somewhat limited in effectiveness.

Several authors have analyzed the problem extensively and have concluded that nothing short of a mobile, aggressive and persistent patrol group with suitable scaring equipment is required to keep birds away from the area surrounding airstrips (Blokpoel, supra; Bruce MacKinnon, Transport Canada, New Technologies in Wildlife Control, Airport Wildlife Management, No. 19, Fall 1996).

It is therefore apparent that despite many efforts over the past century, there is still a clear need for an effective method of keeping wildlife out of the vicinity of airports.

The same problem is found in relation to agricultural lands where birds and wildlife cause significant crop damage, and in relation to landfills, which attract birds and wildlife and offer the opportunity for them to spread disease.

It is therefore an object of the present invention to provide a method of suppressing wildlife from designated areas such as airstrips, agricultural land and landfills. It is a specific object of this invention to provide such a method which overcomes the problem of habituation to scaring tactics.

It is a further object of the invention is to achieve wildlife suppression in a designated area while avoiding irreparable damage to the wildlife and to the environment.

It is yet a further object of the invention to provide a system which may optionally be manually controlled or fully automated so as not to require continuous human supervision.

These and other objects of the invention will be more fully appreciated from the disclosure, which follows.

SUMMARY OF THE INVENTION

This invention proceeds on the premise that in order to effectively suppress wildlife from a designated area, it is necessary to not only prevent habituation to the stimuli that are used, but to actually condition the wildlife to avoid the area.

In achieving conditioning according to the invention, randomization of the nature of the dispersal stimuli (which has been the objective of much of the prior art) is avoided. Instead, predetermined, consistent and recognizable warning stimuli are associated with the designated area. This allows the wildlife to consistently recognize the stimuli as comprising a warning. In addition, the warning stimuli is presented as a precursor to a real and enforceable threat, which threat will be displayed and eventually enforced if the wildlife fails to leave the designated area. It is the backing up of the warning or precursor stimuli with true negative consequences which are innately recognized by wildlife as undesirable which produce the conditioned response, i.e. avoiding the restricted area and avoiding or withdrawing from the warning stimuli.

According to conditioning theory, "unconditioned stimuli" are stimuli that wildlife react to innately such as food, discomfort or certain kinds of danger such as natural predators. In the case of negative unconditioned stimuli, wildlife will innately recognize and avoid the stimuli. When other stimuli are repeatedly associated with "unconditioned stimuli", wildlife may eventually produce a response (the "conditioned response") to such other stimuli that is the same as the natural response to the unconditioned stimuli. In the context of the present invention, the warning or precursor stimuli may be viewed as the conditioned stimuli while the enforcement action may be viewed as the "unconditioned stimuli". The avoidance of the warning stimuli and indeed of the restricted area is the desired conditioned response.

The enforceable threat is chosen such that if the threat is realized, the action taken will not irreparably damage the wildlife and will not damage the environment.

In one aspect, the invention comprises a method of conditioning wildlife to refrain from entering a restricted area comprising defining the boundaries of said restricted area, and each time wildlife enters the restricted area, first producing at least one predetermined stimulus which is perceptible to the wildlife, if the wildlife commences egress from the restricted area after the production of the stimulus, discontinuing the stimulus, but if the wildlife fails to commence egress from the restricted area after the production of the stimulus, directing compelling enforcement against the wildlife.

In another aspect, the wildlife is allowed a predetermined time to commence egress before enforcement is undertaken.

In a further aspect, if the production of warning stimuli does not cause the wildlife to commence egress, the threat will be displayed, such as by the targeting of the threat dispenser where the threat consists of a projectile, or for example by the projection of a projectile not intended to actually reach the wildlife. If such threat display is ineffective, realization of the threat with actual enforcement is then used.

In yet another aspect, the invention comprises a method of conditioning wildlife to refrain from entering a restricted area comprising defining the boundaries of the protected area within a more broadly defined warning zone. Each time wildlife enters the warning zone, at least one predetermined stimulus which is perceptible to said wildlife is produced. If the wildlife then commences egress from the warning zone, the stimulus is discontinued. If the wildlife fails to commence egress, a predetermined realizable threat directed to said wildlife is displayed. If the wildlife then commences egress from the warning zone, the display is discontinued. If the wildlife enters into the restricted area, the threat is realized.

Another aspect of the invention seeks to transfer some of wildlife's learned behaviour in avoiding the designated area to also avoiding aircraft. This is accomplished by using warning stimuli that mimic the acoustic and visual cues of approaching aircraft.

The principles and methods of the invention apply to all wildlife and to any environment, but they are particularly suited to airports, agricultural lands and landfills.

Further and alternative aspects of the invention will be appreciated by reference to the disclosure and the claims which follow.

DETAILED DESCRIPTION OF THE PREFERRED AND ALTERNATIVE EMBODIMENTS OF THE INVENTION

Figure 1:
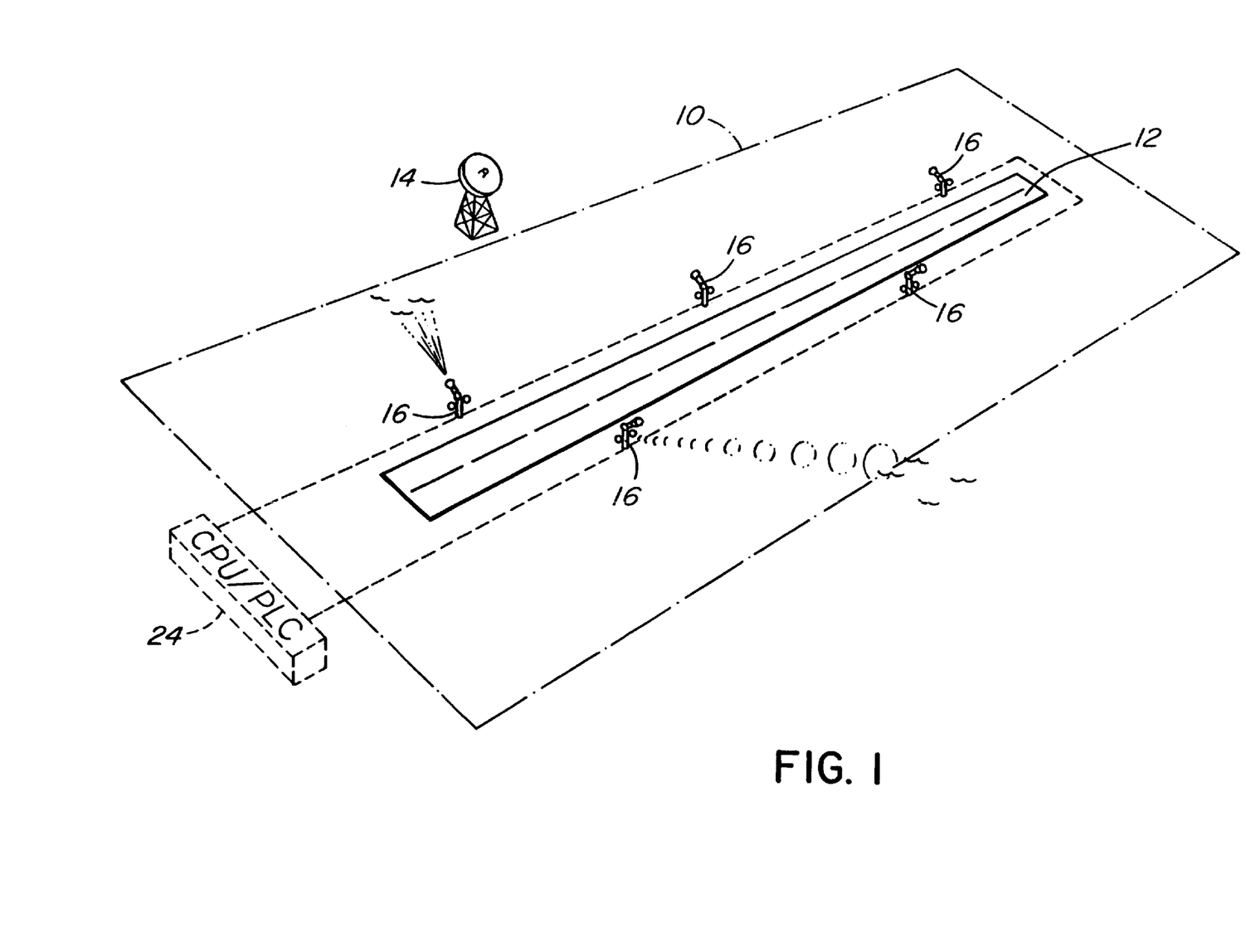
FIG. 1 is a sketch illustrating the preferred embodiment of the invention in relation to the area surrounding an airstrip; and, FIG. 2 is a plan view of a protected area around an airstrip including a Warning Zone and an Enforcement Zone according to the invention; and, FIG. 3 is a perspective view of a stand, stimuli means and threat dispenser according to a preferred embodiment of the invention.
Figure 3:
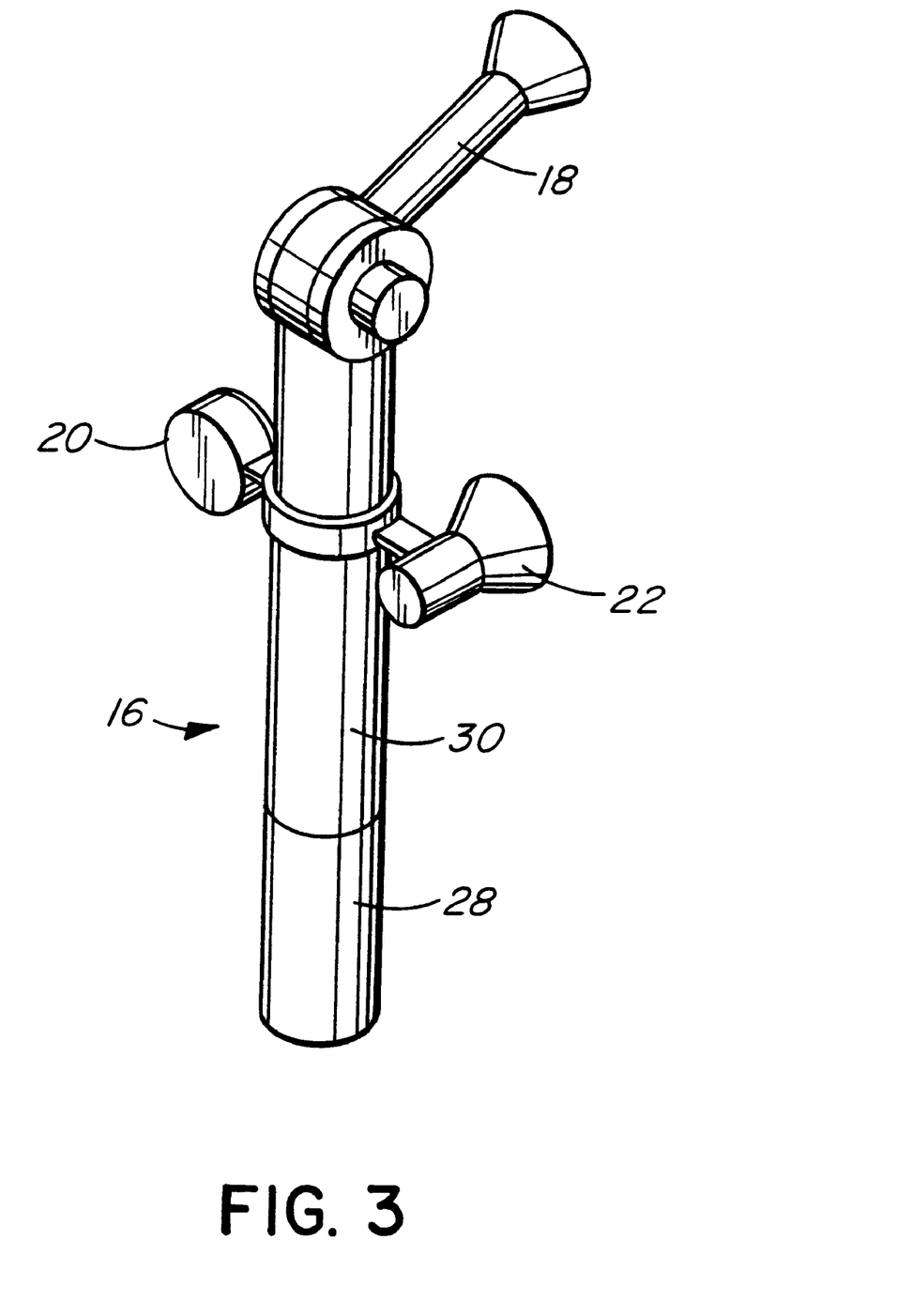

In the preferred embodiment illustrated in FIGS. 1 and 3, a protected area 10 is defined in relation to an airstrip 12. The components of the area suppression system of the preferred embodiment include a sensor 14, a stand 16 having a stationary base 28, a rotatable column 30, a targetable threat dispenser 18, visual stimuli means 20, acoustic stimuli means 22 and processing means 24.

When the suppression system is in operation, the sensor 14 is used to detect the ingress or presence of wildlife in the protected area. Data from sensor 14 is communicated to processing means 24, which determines whether the data represents undesirable wildlife. If it does, the visual stimuli means 20 and the acoustic stimuli means 22 will target the wildlife. Once targeted, the visual and acoustic stimuli are directed at the wildlife. The sensor 14 and the processing means 24 continue to track the wildlife. In tandem with the targeting of the stimuli, the threat dispenser is also targeted. The combined effect of the production of stimuli and the physical movement associated with the targeting of the stimuli means and the threat dispenser amount to a display of a threat to the wildlife.

If the wildlife fails to commence egress from the protected area, the threat dispenser 18 will actually enforce the threat with action directed against the wildlife.

The sensor 14 used in the preferred embodiment is radar with 3D scan capability to assess not only the distance and biomass of wildlife in the coverage area but also its elevation and direction of movement. The radar array 14 is located in such a manner as to provide effective coverage of the protected area 10 and of the immediately adjacent areas. It may also be integrated into the stand 16.

Communication means (not shown) are provided to enable the processing means 24 to communicate with the radar array 14.

Stand 16 includes a stationary base 28 and a rotatable column 30. Column 30 includes drive means and is adapted to be rotated to provide an effective field of view that corresponds to the protected area. In the preferred embodiment, the visual stimuli means 20 and the acoustic stimuli means 22 are each mounted on the targetable threat dispenser 18 such that the targeting of the threat dispenser may be performed at the same time as the visual and acoustic stimuli are produced. The processing means 24 may be mounted on a platform associated with the column 30, or may be at a location remote from the stand 16 as in the preferred embodiment.

The visual stimuli means 20 of the preferred embodiment is a directional light that is mounted on targetable threat dispenser 18 so as to direct its beam toward targeted wildlife. The acoustic stimuli means 22 comprises a speaker which is also selected and configured to preferentially project sound toward targeted wildlife. It will be appreciated that a broad range of sensory stimuli may be equally effective.

The preferred embodiment of the threat dispenser 18 is a high pressure water cannon capable of dispatching a concentrated water jet and capable of effectively reaching all points in the protected area 10 under normal wind and weather conditions.

In some cases, the water cannon may be located far from potential targets thereby sometimes requiring a curved trajectory for the water jet to reach the target. Thus the targeting of the water cannon will not be line of sight as will be the visual and acoustic stimuli. In such cases, the water cannon may have a targeting and drive mechanism which is independent of the targeting and drive mechanism for the stimuli means 20 and 22. This may involve providing an arm for the stimuli means that is separate from the water cannon. Alternatively, the water cannon may be movable in the vertical plane by means of a stepped motor controller and the stimuli means carried on the water cannon may be provided with a wide enough angle of view or effect to still be perceptible to wildlife being targeted by the water cannon.

Processing means 24 is preferably provided in the stand or in a box associated with the stand. However, it may also be housed at a location remote from the stand or from the airstrip, with suitable communication means between the processing means and the other components of the suppression system.

Processing means 24 includes a CPU and software having the functionality detailed below as well as controlling communications, reporting and self diagnostic functions. Typically, processing means 24 will comprise a computer or programmable logic controller (PLC).

The operation of the preferred embodiment of the invention will now be described.

Radar 14 is usually in active mode and scans the protected area and the immediately adjacent areas for moving objects. The output of the radar is continually fed to PLC 24 for analysis.

PLC 24 runs a threat assessment program that analyzes the output of the radar to identify moving targets. Once a moving target is acquired, the radar tracks the target. PLC 24 then correlates the data to the boundaries of the protected area 10 and to decide whether the target is approaching, is entering or is already in the protected area. If it is, the target is then analyzed to determine what it is by reference to its biomass, its speed, its elevation, its direction and whether or not it appears to be part of a flock or a group.

Based on the identification of the target(s), a decision is made whether it falls into the classes of wildlife that are to be suppressed from the protected area. For example, if analysis of the target leaves open the possibility that it is human, or indeed anything other than a category of wildlife identified as a threat, the area suppression system will not be further engaged.

If the target(s) is (are) positively identified as engageable and is entering or is already in the protected area 10, PLC 24 causes the water cannon 18, the directional light 20 and the directional speaker 22 to be aimed at the intruding wildlife. Where the components are each mounted on arm 30 and the distance to the target is short enough to treat the water cannon as effective on line of sight, it will only be necessary to target arm 30. Otherwise, the water cannon will be independently targetable at least in the vertical plane to compensate for the distance to the target.

Alternatively, the water cannon and precursor stimuli may be mounted co-directionally but in order to render the stimuli perceptible by the target over larger distances (when the cannon will not be targeted by line of sight) the field of view of the stimuli devices may be broadened.

The directional light 20 is activated and acoustic stimulus is produced by the speaker 22. As light 20 and speaker 22 are configured to be directional and are mounted on arm 30, the light and the sound will be directed toward the intruder.

If the intruding wildlife fails to commence and continue egress from the protected area after a predetermined time, the water cannon is activated to dispatch a concentrated jet of high-pressure water toward the wildlife.

Thus, intruding wildlife is expected to learn that the targeting and production of visual and acoustic stimuli and the targeting of the threat dispenser are but precursors to the realization of a physical or biological threat, and that failing egress from the area, the threat will be realized.

In another embodiment of the invention, the threat display is treated as being the targeting of the threat dispenser as opposed to the tandem production of stimuli and targeting of the threat dispenser. In that case, the threat dispenser is independently targetable and is targeted only if the animal fails to commence egress from the protected area following the production of precursor stimuli. Thus, the operation of the system is broken down into three sequential stages if the wildlife fails to commence and continue egress: the production of precursor stimuli, the display by the threat dispenser, or the enforcement of the threat by action. The demarcation between the three stages is temporal.

In yet another embodiment, the display of the threat is staged. The first stage consists of the targeting of the arm 30 and the threat dispenser 18, and the production of stimuli. The second stage of the threat display consists of the projection by the water cannon of a wide-angle high-pressure fog-type spray which is not intended to necessarily reach the wildlife. The eventual enforcement of the threat would consist of concentrating the stream of water into a jet directed at the intruding wildlife. In this embodiment, the water cannon nozzle must be adjustable between the spray mode and the concentrated jet mode.

Figure 2:
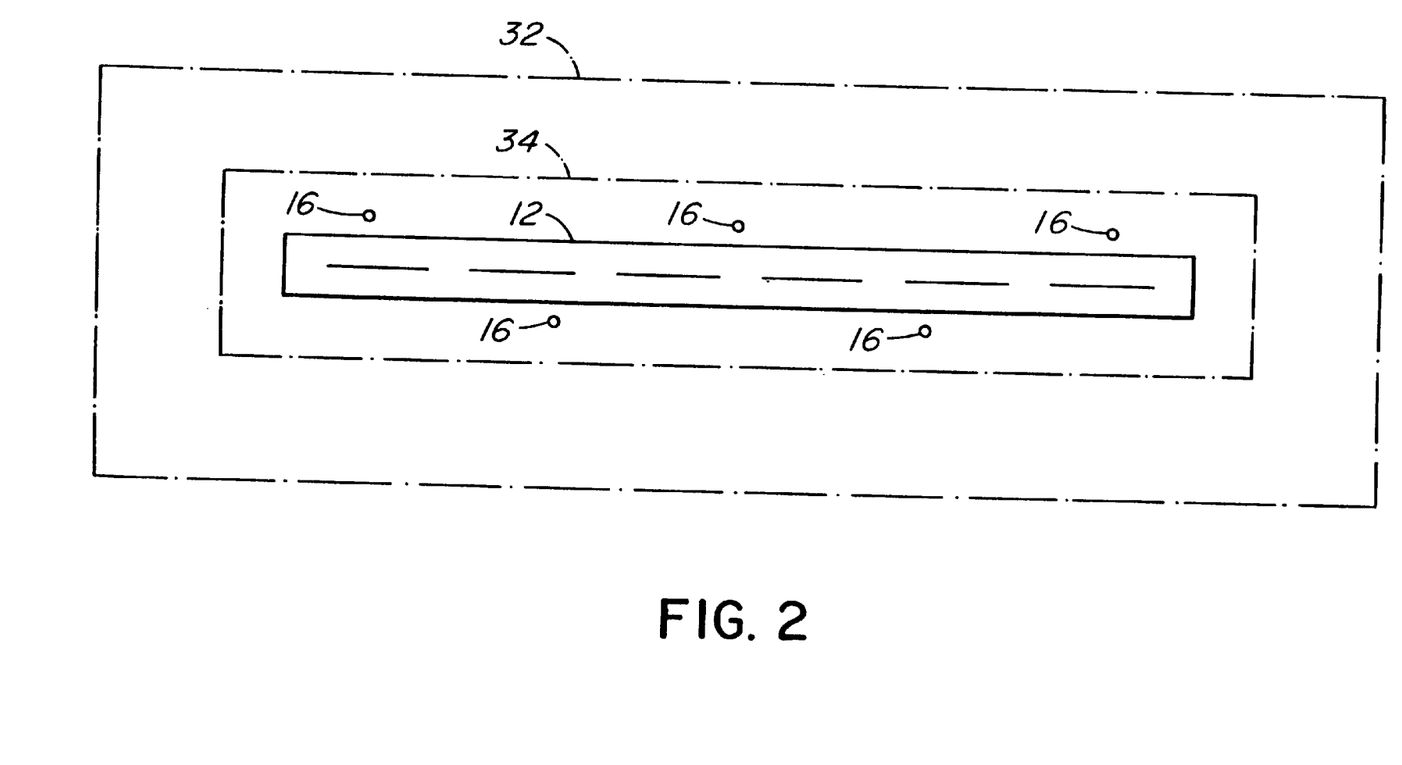

Another embodiment of the invention relies on a demarcation between the threat display and threat enforcement which is based on the intruding wildlife's proximity to the protected area rather than a temporal demarcation. This embodiment is illustrated in FIG. 2. A first Warning Zone 32 is defined around a narrower Enforcement Zone 34. As intruding wildlife enters the Warning Zone, the stimuli are produced and directed toward the wildlife.

If the intruding wildlife commences egress from the protected area, the visual and acoustic stimuli are terminated. If the intruding wildlife fails to commence egress, the threat dispenser displays a threat (either by targeting or by ejecting a broad spray of water).

If the intruding wildlife enters the Enforcement Zone, the threat dispenser is activated and action is directed against the wildlife.

The foregoing embodiment will be useful to extend the effective perimeter of action of the suppression system beyond the effective range of the threat dispensers, it only being necessary in this case for the threat dispenser to be able to effectively cover the Enforcement Zone. In such cases, instead of a broad spray of water, the threat display may consist of the ejection of a concentrated water jet before the intruding wildlife reaches the Enforcement Zone, such that the water jet is not likely to actually reach the wildlife. As in the case of the preferred embodiment, the threat display may also be taken to be the simultaneous targeting of the threat dispenser and the production of precursor stimuli.

It may also be advisable to provide statistical randomness in the production of the warning stimuli so as to avoid learning by the wildlife of the precise location of the Warning Zone and of the Enforcement Zone. If such can be achieved, the wildlife will effectively be kept farther away from the restricted area. This may be accomplished by randomizing, not the nature of the precursor stimuli, but rather at what stage of ingress into or toward the restricted area the stimuli is produced. Thus in some cases, it will be produced when the wildlife is at a relatively greater distance from the Enforcement Zone that other times. Nonetheless, the stimuli should preferably be produced when the wildlife is within the perimeter of the Warning Zone so that a consistent association with the realizable threat can be learned. In one embodiment, there may be two zones, one consisting of a Warning Zone, the other consisting of a combined Warning/Enforcement Zone. The operation of the invention in the Warning Zone is as described earlier. However, if the wildlife proceeds to the Warning/Enforcement Zone, in some cases, enforcement will be immediate while in other, unpredictable cases, the warning stimuli may continue somewhat longer before enforcement occurs. This represents a temporal view of the operation. It will be appreciated that this can also be viewed as a varying geographic demarcation for the Enforcement Zone, enabling a wider Enforcement Zone to be established.

The invention is also amenable to use on a mobile platform with a manual operator. For example, the warning stimuli devices, a water cannon and a suitable water supply may be mounted on a vehicle, trailer or pallet. This may be the desired deployment of choice in applications such as landfills, vineyards, berry farms, orchards or smaller airports, etc. or any other situation where economics, terrain or application suitability dictate the use of a mobile version of the invention. Because of the mobility of the above described versions of the invention, the surrounding warning zones and enforcement zones will consequently be defined in relation to the location of the mobile platform.

In the cases of manual operation, no processing means is required when in manual operation mode.

In a variation on the foregoing embodiment, the precursor stimuli are provided in the Warning Zone. If the intruding wildlife enters the Enforcement Zone, the threat display consists of the targeting of the water cannon. If the wildlife then does not commence egress within a predetermined time, the threat is enforced with action.

It will be appreciated that while the water cannon is the preferred embodiment of the threat dispenser due to its non-lethal and environment friendly nature, other forms of threat dispensers may be used. These might include any threat dispenser that poses a real and enforceable threat. In the preferred embodiment the threat dispenser involved a form of physical contact (water dispatched as a projectile) with the wildlife. Other examples may include chemical or olfactory devices, lasers, etc. It is also contemplated to project ice pellets rather than water in certain circumstances, for example where water is relatively scarce. As in the case of liquid water, ice pellets cause no damage to the environment.

The method of the invention relies on the premise that wildlife must be affirmatively conditioned to avoid a protected area. Such conditioning must be based on a consistently recognizable and reproducible warning, followed by a real and realizable threat that will be enforced if the warning is not heeded. The enforcement must consist of a real negative consequence for the animal that the animal would normally innately recognize and avoid. The combination of the consistency of the warning with the realization of the threat creates effective conditioning to avoid the warning stimuli and to avoid the restricted area altogether. A warning without the enforcement of the threat implied by the warning will eventually be recognized by wildlife as a hollow threat and will become ineffective. The conditioning of the wildlife is enhanced by associating the warning and the threatened and real enforcement with a given and consistent protected area. Such conditioning is further enhanced by consistently reproducing the warning, display and enforcement substantially every time undesirable wildlife enters the protected area.

The method of the invention minimizes the wastage of water or other enforcement resources, as enforcement is used only as a last resort. In addition, as the wildlife become conditioned to avoid the protected area, the frequency of enforcement will be reduced.

While the preferred embodiments of the invention use two forms of stimuli in tandem (visual and acoustic), conditioning of wildlife according to the principles of the invention may be achieved with a single form of stimulus.

The preferred approach is to provide stimuli that are separate from the threat dispenser thereby providing a broader selection of stimuli, which are more likely to capture the attention of wildlife.

It will also be appreciated that in a typical application of the invention, a plurality of threat dispensers will be deployed in spaced relationship to obtain effective coverage over the area to be protected. Such would be the case at a large airport, orchard, vineyard, etc. In FIGS. 1 and 2, a plurality of stimuli and water cannon devices are illustrated.

According to another aspect of the invention, the stimuli are selected so as to resemble the characteristics of aircraft. Thus light 20 is selected so as to resemble the flashing red anti-collision lights of aircraft and the sound produced by the speaker resembles the compressor noises emitted towards the front of aircraft. This enables the wildlife to be conditioned to interpret aircraft as a threat in accordance with the learned behaviour induced by the invention.

It will be appreciated by those skilled in the art that the preferred and alternative embodiments of the invention has been described in some detail. However certain variations to the embodiments may be practiced without departing from the principles of the invention, which is to be determined by reference to the disclosure as a whole and the following claims.

What is claimed is:

1. A method of conditioning wildlife to refrain from entering a restricted area comprising:

defining the boundaries of said restricted area, and
upon each entry of wildlife into said restricted area:
first producing at least one predetermined stimulus which is perceptible to said wildlife;
if the wildlife commences egress from the restricted area after the production of said stimulus, discontinuing said stimulus;
if the wildlife fails to commence egress from the restricted area after the production of said stimulus, directing compelling enforcement against the wildlife.

2. A method as in claim 1 wherein directing said compelling enforcement involves physical contact with the wildlife.

3. A method as in claim 1 wherein said enforcement comprises the dispatch of a projectile toward the wildlife.

4. A method as in claim 3 wherein said stimulus comprises sensory stimulus in conjunction with visible targeting of a device for directing said compelling enforcement toward said wildlife.

5. A method as in claim 3 wherein said projectile comprises water and said water is dispatched using a water cannon.

6. A method as in claim 3 wherein said projectile comprises ice pellets.

7. A method as in claim 1 wherein said step of directing compelling enforcement is performed only after a predetermined time interval has elapsed since the production of said stimulus.

8. A method as in claim 1 wherein said step of directing compelling enforcement is performed after a time interval has elapsed since the production of said stimulus and the time interval is randomized after each successive entry of wildlife into said restricted area.

9. A method of conditioning wildlife to refrain from entering a restricted area comprising:
defining the boundaries of said restricted area, and
upon each entry of wildlife into said restricted area:
first producing at least one predetermined sensory stimulus which is perceptible to said wildlife;
if the wildlife commences egress from the restricted area a predetermined time after the production of said stimulus, discontinuing said stimulus;
if the wildlife fails to commence egress from the restricted area after said predetermined time, directing compelling enforcement comprising physical contact against the wildlife.

10. A method as in claim 9 wherein said sensory stimulus comprises at least one of the following: sound, light.

11. A method as in claim 10 wherein said enforcement comprises a water cannon.

12. A method as in claim 11 further comprising a sensor for detecting the ingress and egress of wildlife in the restricted area.

13. A method as in claim 12 wherein said sensor comprises radar.

14. A method as in claims 1, 9 or 10 wherein said the execution of the method steps is controlled by a computer.

15. A method as in claim 1 wherein said compelling enforcement does not include physical contact but is perceptible and uncomfortable to the wildlife.

16. A method of conditioning wildlife to refrain from entering a restricted area comprising, upon each encounter with wildlife in said restricted area:
first producing at least one predetermined stimulus which is perceptible to said wildlife;
if the wildlife commences egress from the restricted area after the production of said stimulus, discontinuing said stimulus;
if the wildlife fails to commence egress from the restricted area after the production of said stimulus, displaying a predetermined realizable threat directed to said wildlife;
if the wildlife commences egress from the restricted area after the display of said realizable threat, discontinuing said display;
if the wildlife fails to commence egress from the restricted area after the display of said realizable threat, realizing on said threat by directing compelling enforcement against the wildlife.

17. A method as in claim 16 wherein the display of a threat is of a nature that is innately recognized by the wildlife as a threat to be avoided.

18. A method as in claim 16 wherein said stimulus is of a nature that is not innately recognized by the wildlife as a threat to be avoided.

19. A method as in claim 16 wherein directing said enforcement comprises the dispatch of a projectile toward the wildlife.

20. A method as in claim 16 wherein said stimulus comprises sensory stimulus.

21. A method as in claim 20 wherein said sensory stimulus is selected from a class comprising sound and light.

22. A method as in claim 19 wherein said threat display comprises a targeting movement of means for dispatching said projectile.

23. A method as in claim 16 wherein said display comprises dispatching a spray of water in the direction of said wildlife, said spray not being calculated to reach the wildlife.

24. A method as in claim 23 wherein said enforcement comprises concentrating said spray of water into a focussed stream directed at the wildlife, said stream being calculated to reach the wildlife.

25. A method as in claim 23 wherein said display comprises both the targeting movement of said enforcement and the dispatch of a spray of water in the direction of the wildlife, said spray not being calculated to reach the wildlife.

26. A method as in claim 25 wherein said enforcement comprises concentrating said spray into a stream of water, said stream being calculated to reach said wildlife.

27. A method as in claim 16 wherein said step of directing compelling enforcement is performed only after a predetermined time interval has elapsed since the display of said threat.

28. A method as in claim 16 wherein said step of directing compelling enforcement is performed after a time interval has elapsed since the display of said threat and the time interval at each successive entry of wildlife into said restricted area is randomized.

29. A method as in claim 16 or 28 wherein said step of displaying said threat is performed only after a predetermined time interval has elapsed since the production of said stimulus.

30. A method as in claim 16 or 28 wherein said step of displaying said threat is performed after a time interval has elapsed since the display of said threat and the time interval at each successive entry of wildlife into said restricted area is randomized.

31. A method as in claim 16 wherein said compelling enforcement involves physical contact with the wildlife.

32. A method as in claim 16 wherein said enforcement comprises the dispatch of a projectile toward the wildlife, said stimulus comprises sensory stimulus, and said display of a threat comprises targeting movement of said enforcement.

33. A method as in claim 19 wherein said projectile comprises water and said enforcement comprises a water cannon.

34. A method as in claim 19 wherein said projectile comprises ice pellets.

35. A method as in claim 32 wherein said stimulus comprises sound or light, said projectile is water and said water is dispatched using a water cannon.

36. A method of conditioning wildlife to refrain from entering a restricted area comprising:
defining the boundaries of said restricted area;
defining a warning zone beyond said boundaries;
and upon each entry of a wildlife into said warning zone:
first producing at least one predetermined stimulus which is perceptible to said wildlife;
if the wildlife commences egress from the warning zone after the production of said stimulus, discontinuing said stimulus;
if the wildlife fails to commence egress from the warning zone after the production of said stimulus, displaying a predetermined realizable threat directed to said wildlife;
if the wildlife commences egress from the warning zone after the display of said realizable threat, discontinuing said display;
if the wildlife enters into said restricted area, realizing on said threat.

37. A method as in claim 36 wherein realizing on said threat involves physical contact with the wildlife.

38. A method as in claim 36 wherein realizing on said threat involves dispatching a projectile toward the wildlife.

39. A method as in claim 38 wherein said projectile is water.

40. A method as in claim 39 wherein said water is dispatched using a water cannon.

41. A method as in claim 36 wherein said stimulus comprises sound or light or both.

42. A method as in claim 38 wherein said projectile comprises ice pellets.

43. A method as in claim 36 wherein said displaying of a realizable threat comprises directing a spray of water in the direction of the wildlife, said spray not being calculated to reach the wildlife.

44. A method as in claim 43 wherein realizing on said threat comprises concentrating said spray into a stream of water directed at the wildlife and calculated to reach the wildlife.

45. A method as in claim 36 wherein the boundaries of said restricted area are randomly adjusted after each entry of wildlife into said warning zone.

46. A method as in claim 36 wherein the boundaries of said warning zone are randomly adjusted after each entry of wildlife into said warning zone.

47. A method as in claim 36 and further comprising a sensor for detecting the ingress and egress of wildlife in the restricted area.

48. A method as in claim 47 wherein said sensor comprises radar.

49. A method as in claims 36, 40 or 47 wherein said the execution of the method steps is controlled by a computer.

50. A method as in claim 36 wherein said step of realizing on said threat does not include physical contact but is perceptible and uncomfortable to the wildlife.

51. A method as in claim 10, 21, 35 or 41 wherein said sound resembles the sounds created by approaching aircraft.

52. A method as in claim 10, 21, 35 or 41 wherein said light resembles the anti-collision lights of aircraft.

53. A method of conditioning wildlife to refrain from entering a restricted area comprising:
    defining the boundaries of said restricted area;
    defining a warning zone beyond said boundaries;
    and upon each entry of a wildlife into said warning zone:
        first producing at least one predetermined stimulus which is perceptible to said wildlife; and
        if the wildlife commences egress from the warning zone after the production of said stimulus, discontinuing said stimulus; and
        if the wildlife enters into said restricted area, the directing compelling enforcement against the wildlife wherein directing compelling enforcement involves physical contact with the wildlife.

54. A method of conditioning wildlife to refrain from entering a restricted area comprising:
    defining the boundaries of said protected area;
    defining a warning zone beyond said boundaries;
    and upon each entry of an wildlife into said warning zone:
        first producing at least one predetermined stimulus which is perceptible to said wildlife; and
        if the wildlife commences egress from the warning zone after the production of said stimulus, discontinuing said stimulus; and
        if the wildlife enters into said restricted area, directing compelling enforcement against the wildlife wherein the directing compelling enforcement comprises dispatching a projectile toward the wildlife.

55. A method as in claim 54 wherein said projectile is water.

56. A method as in claim 55 wherein said water is dispatched using a water cannon.

57. A method as in claim 54 wherein said projectile comprises ice pellets.

58. A method of conditioning wildlife to refrain from entering a restricted area comprising:
    defining the boundaries of said restricted area;
    defining a warning zone beyond said boundaries;
    and upon each entry of an wildlife into said warning zone:
        first producing at least one predetermined stimulus which is perceptible to said wildlife; and
        if the wildlife commences egress from the warning zone after the production of said stimulus, discontinuing said stimulus; and
        if the wildlife enters into said restricted area, directing compelling enforcement against the wildlife;
    wherein said stimulus comprises directing a spray of water in the direction of the wildlife, said spray calculated to not reaching the wildlife.

59. A method of conditioning wildlife to refrain from entering a restricted area comprising:
    defining the boundaries of said restricted area;
    defining a warning zone beyond said boundaries;
    and upon each entry of an wildlife into said warning zone:
        first producing at least one predetermined stimulus which is perceptible to said wildlife; and
        if the wildlife commences egress from the warning zone after the production of said stimulus, discontinuing said stimulus; and
        if the wildlife enters into said restricted area, directing compelling enforcement against the wildlife;
    wherein the boundaries of said restricted area are randomly adjusted after each entry of wildlife into said warning zone.

60. A method of conditioning wildlife to refrain from entering a restricted area comprising:
    defining the boundaries of said restricted area;
    defining a warning zone beyond said boundaries;
    and upon each entry of an wildlife into said warning zone:
        first producing at least one predetermined stimulus which is perceptible to said wildlife; and
        if the wildlife commences egress from the warning zone after the production of said stimulus, discontinuing said stimulus; and
        if the wildlife enters into said restricted area, directing compelling enforcement against the wildlife;
    wherein the boundaries of said warning zone are randomly adjusted after each entry of wildlife into said warning zone.

61. A method of conditioning wildlife to refrain from entering a restricted area comprising:
    defining the boundaries of said restricted area;
    defining a warning zone beyond said boundaries;
    and upon each entry of an wildlife into said warning zone:
        first producing at least one predetermined stimulus which is perceptible to said wildlife; and
        if the wildlife commences egress from the warning zone after the production of said stimulus, discontinuing said stimulus; and
        if the wildlife enters into said restricted area, directing compelling enforcement against the wildlife;
    and further comprising a sensor for detecting the ingress and egress of wildlife in the restricted area.

62. A method as in claim 61 wherein said sensor comprises radar.

63. A method as in claim 61 wherein execution of the method steps is controlled by a computer.

64. A method as in claim 10, 21, 35 or 41 wherein said sound resembles the sounds created by approaching aircraft.

65. A method as in claim 10, 21, 35 or 41 wherein said light resembles the anti-collision lights of aircraft.

66. A method as in claims 16 or 36 wherein the method is implemented using a plurality of threat dispensers for displaying said threat and realizing on said threat, said plurality of threat dispensers spaced to provide effective coverage over the restricted area.

67. A method as in claim 1, 9, 16 or 36 wherein said method is implemented using a single threat dispenser comprising a water cannon.

68. A method as in claim 1, 9, 16 or 36 wherein said restricted area comprises a zone around mobile apparatus for producing said stimulus and a mobile threat dispenser.

\* \* \* \* \*